(12) United States Patent
Tatem

(10) Patent No.: US 10,334,182 B1
(45) Date of Patent: Jun. 25, 2019

(54) MULTI-SWITCH MODULE EXPANDER

(71) Applicant: AT&T Intellectual Property I, L.P., Atlanta, GA (US)

(72) Inventor: Richard Tatem, Middletown, MD (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/832,472

(22) Filed: Dec. 5, 2017

(51) Int. Cl.
*H04N 21/61* (2011.01)
*H04N 5/268* (2006.01)
*H04N 21/4385* (2011.01)

(52) U.S. Cl.
CPC ......... *H04N 5/268* (2013.01); *H04N 21/4385* (2013.01); *H04N 21/6143* (2013.01); *H04N 21/6193* (2013.01)

(58) Field of Classification Search
CPC ............... H04N 5/268; H04N 21/4385; H04N 21/6143; H04N 21/6193
See application file for complete search history.

(56) References Cited

U.S. PATENT DOCUMENTS

| | | | |
|---|---|---|---|
| 5,838,393 A * | 11/1998 | Simpson | ................ H04N 5/268 348/705 |
| 7,705,248 B2 | 4/2010 | Loeffelholz et al. | |
| 7,787,482 B2 | 8/2010 | Blinick et al. | |
| 8,082,570 B2 | 12/2011 | Olson et al. | |
| 8,323,049 B2 | 12/2012 | Ngo | |
| 8,571,464 B2 | 10/2013 | Norin | |
| 8,699,983 B2 | 4/2014 | Xiu et al. | |
| 9,351,414 B1 | 5/2016 | Tatem et al. | |
| 9,461,693 B1 | 10/2016 | Shah et al. | |
| 9,657,891 B1 | 5/2017 | Tatem et al. | |
| 9,729,935 B1 | 8/2017 | Tatem | |
| 2011/0283331 A1 * | 11/2011 | Riggsby | .................... H03F 3/62 725/106 |
| 2012/0224337 A1 | 9/2012 | Bodine et al. | |
| 2014/0130107 A1 * | 5/2014 | Tatem | .................... H04H 20/63 725/81 |

OTHER PUBLICATIONS

"DIRECTV 19-0629-02 Quad SWM-E4 Expander for Four DIRECTV SWM Switches", http://www.solidsignal.com/pview.asp?p=swme4.
"Single Wire Multiswitch", DirecTv.
"DIRECTV SWM16 Single-wire Switch and Power Inserter", http://www.swm8.com/swm16-specifications.php.

* cited by examiner

*Primary Examiner* — Michael E Teitelbaum
(74) *Attorney, Agent, or Firm* — Haynes and Boone, LLP

(57) ABSTRACT

A multi-switch module expander includes a chassis that includes signal input ports and signal output ports configured to couple with signal input ports provided on a first multi-switch module and couple with signal input ports provided on a second multi-switch module. A splitting circuit is housed in the chassis and coupled to the signal input ports and the signal output ports. The splitting circuit is configured to provide signals received at each signal input port of the multi-switch module expander to respective signal input ports of the first multi-switch module and the second multi-switch module that are coupled with the signal output ports of the multi-switch module expander.

16 Claims, 10 Drawing Sheets

MULTI-SWITCH MODULE EXPANDER

FIELD OF THE DISCLOSURE

This disclosure relates generally to a satellite television receiving system, and, more particularly, to an expander for multi-switch modules in the satellite television receiving system.

BACKGROUND

To facilitate satellite broadcast service for a residential user, a satellite service provider installs one or more "satellite dish" antennas at the user's residence. The satellite dish will commonly be placed on the roof, attached to an exterior wall with appropriate (e.g., southern) exposure, or mounted on a pole in the yard, as long as line of sight with the satellite is not obstructed by trees, mountains or other structures. However, for potential users in higher-density housing environments, such as "multi-dwelling units" (MDU) in which individual housing units for residents or tenants are contained within one building or several buildings within one complex (e.g., apartments, condominiums, office suites, commercial and hotels), the provision of individual satellite dishes to each user may be impractical or even prohibited. Not all residents of multi-dwelling units have an exterior wall or balcony with appropriate exposure, and those that do may be blocked by adjacent structures. Additionally, building codes and community rules (e.g., condominium association rules) may restrict the use of satellite dishes.

To address these issues, satellite service providers may install local content distribution systems within large multi-dwelling units to service multiple units/users from a single satellite dish antenna. A common dish may be used for each individual units/user and various electrical components are used to distribute the signals to the individual units/users. One of these components is a single wire multi-switch (SWM) module that can distribute satellite TV signals to multiple receivers (e.g., a set top box) from the common dish. Some SWM modules may provide thirty or more channels, which are frequency blocks. Thus, the SWM modules can accommodate up to thirty receivers that each include a tuner that is assigned a channel, assuming one channel per tuner. However, some MDUs require more than thirty channels. Thus, technicians must install multiple SWM modules to service the MDU. Having more than one SWM module requires splitting the signal provided on the satellite dish antenna to each SWM module, which in turn requires splitters, extra cabling, and most likely amplifiers to account for the signal loss due to this extra equipment. Furthermore, each SWM module requires a power supply, and thus given the size of some data closets, the additional equipment creates and unorganized environment, provides more points of failure, and is difficult for a technician to determine the wiring topology, thus increasing service time when servicing the local content distribution system or requires the addition and/or removal of devices from the local content distribution system. Reducing the time and the number of components for the local content distribution systems is desirable.

Thus, the Applicant recognizes that there is a need for an improved local content distribution system.

SUMMARY

A local content distribution method and system may include a multi-switch module expander that is configured to receive power from a power source and content signals from a satellite receiving antenna and provide that power and those content signals to a plurality of multi-switch modules. The multi-switch module expander may include an amplifying circuit that may amplify a content signal to account for a loss in the content signal due to splitting circuits included in the multi-switch module expander that split the received content signals and provide those signals to each of the plurality of output ports that are coupled to a content signal input port of a multi-switch module. Thus, the multi-switch module expander of the present disclosure greatly simplifies a local content distribution system in an MDU requiring more than one multi-switch module by eliminating the need for splitters, cabling, amplifiers and other components in conventional local content distribution system(s) requiring more than one multi-switch module.

In various embodiments of the methods and systems disclosure herein, a multi-switch module expander is disclosed and may include a multi-switch module expander chassis. A first set of signal input ports are provided on the multi-switch module expander chassis. A first set of signal output ports are provided on a first surface of the multi-switch module expander chassis and configured to couple with a second set of signal input ports provided on a first multi-switch module. A second set of signal output ports are provided on a second surface of the multi-switch module expander chassis and configured to couple with a third set of signal input ports provided on a second multi-switch module. The second surface may be the first surface. The multi-switch module expander further includes a splitting circuit housed in the multi-switch module expander chassis and coupled to the first set of signal input ports, the first set of signal output ports, and the second set of signal output ports. The multi-switch module expander is configured to provide signals received at each signal input port of the first set of signal input ports to a first respective signal output port of the first set of signal output ports and to a second respective signal output port of the second set of signal output ports.

In various embodiments of the methods and systems disclosed herein, the multi-switch module expander may include a first power input port provided on the multi-switch module expander chassis that is configured to couple with a power source and provide power to the splitting circuit.

In various embodiments of the methods and systems disclosed herein, the multi-switch module expander may include a first power output port and a second power output port, and may include a power divider coupled to the first power input port, the first power output port, and the second power output port, such that the power divider is configured to provide a first portion of power received on the first power input port to the first power output port and a second portion of the power to the second power output port.

In various embodiments of the methods and systems disclosed herein, the multi-switch module expander may include an amplifying circuit housed in the multi-switch module expander chassis and coupled to the splitting circuit. The amplifying circuit is configured to amplify the signals before the signals are provided to the first set of signal output ports and the second set of signal output ports to account for a loss provided by the splitting circuit.

In various embodiments of the methods and systems disclosed herein, the first set of signal output ports and the second set of signal output ports each include a self-terminating circuit.

In various embodiments of the methods and systems disclosed herein, the multi-switch module expander may include at least one multi-switch module expander mounting member coupled to the multi-switch module expander chassis. The at least one multi-switch module expander mounting member is configured to mount a surface of the multi-switch module expander chassis that does not include a port to a mounting structure.

In various embodiments of the methods and systems disclosed herein, the multi-switch module expander may include a multi-switch module expander coupling member coupled to the multi-switch module expander chassis and configured to couple with a multi-switch module mounting feature provided on at least one of the first multi-switch module and the second multi-switch module. The multi-switch module mounting feature is configure to otherwise mount at least one of the first multi-switch module and the second multi-switch module to a surface when not coupled with the multi-switch module expander coupling member.

In various embodiments of the methods and systems disclosed herein, the first multi-switch module and the second multi-switch module are single-wire multi-switch modules that are configured to multiplex the signals received via the second set of signal input ports and the third set of signal input ports, respectfully, and provide a portion of those multiplexed signals through a single-wire output port provided on each of the first multi-switch module and the second multi-switch module via a plurality of channels.

In various embodiments of the methods and systems disclosed herein, the first set of signal input ports, the first set of signal output ports, and the second set of signal output ports include a coaxial cable port.

In various embodiments of the methods and systems disclosed herein, the signal input ports and the signal output ports may be generally orthogonal to a respective surface of the multi-switch module expander chassis. In various embodiments, the signal input ports may be generally orthogonal to the signal output port. The signal output ports of the first set of signal output ports may be aligned and equispaced from each other while the signal output port of the second set of signal output ports may aligned and equispaced from each other.

DETAILED DESCRIPTION

The systems and methods of the present disclosure provide a multi-switch module expander that is configured to provide content signals provided by a satellite receiving antenna and configured to provide power to a plurality of multi-switch modules, which offers several benefits over conventional local content distribution systems that include a plurality of multi-switch modules. As discussed above, conventional local content distribution systems with a plurality of multi-switch modules requires splitting the content signal provided by the satellite receiving antenna to each multi-switch module, which in turn requires splitters, extra cabling, and amplifiers to account for the signal loss due to the equipment. Furthermore, each multi-switch module requires a power supply, and thus given the size of some data closets, all of the additional equipment to add an additional multi-switch module creates an unorganized environment, provides more points of failure, and is difficult for a technician to determine the wiring topology local content distribution system, which increases service time when servicing the local content distribution system and/or requires the addition and/or removal of devices from the local content distribution system. The multi-switch module expander of the present disclosure addresses these issues by providing splitting circuits, an amplifying circuit, and power distribution within a chassis of the multi-switch module expander that is further configured to couple to and secure a plurality of multi-switch modules to the chassis of the multi-switch module expander such that the multi-switch module expander eliminates the need for the extra splitters, power supplies, cabling, and amplifiers that are required in traditional systems.

Figure 1:
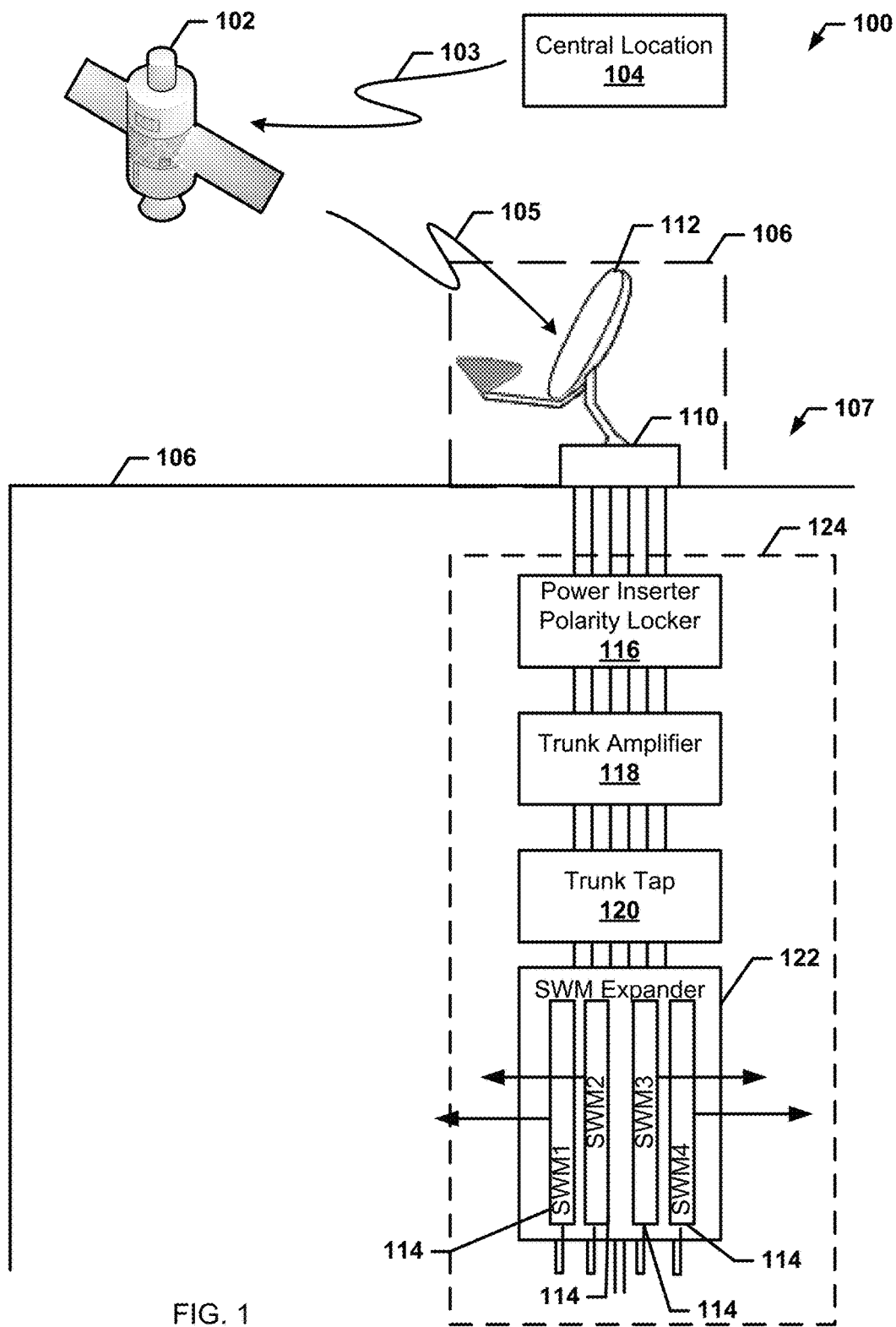
FIG. 1 is a schematic view illustrating an embodiment of content distribution for a satellite content broadcasting system.

Referring now to FIG. 1, a content distribution system 100 is shown for broadcasting content included in, for example, television signals. The content distribution system 100 includes a satellite 102 that is configured to receive content, for example, via a receiving antenna, from a central location 104. The central location 104 may be a data processing facility or headend, which may receive content (e.g., data input programming) from multiple sources. The central location 104 may combine the content from the various sources and may distribute the content to user subscriber locations via wireless signals. The wireless signals, for example, may be digital and in a format used for satellite communications. For example, the wireless signals may be transmitted in one or more radio frequency (RF) bands, e.g., the microwave Ka-band (26.5-40 GHz) and/or Ku-band (12.4-18 GHz). The wireless signal may additionally or alternatively include other RF bands (e.g., 12.2-12.7 GHz and/or 18.3-20.2 GHz). The central location 104 may generate wireless signals 103 through a transmitting antenna, which are received by a receiving antenna of the satellite 102. A transmitting antenna provided by the satellite 102 generates wireless signals 105 directed to various receiving systems including stationary and/or moving systems at user subscriber locations such as those in a multiple dwelling unit (MDU) 106. The MDU 106 may be a single building with multiple individual units such as a hotel or an apartment building, a property with multiple buildings, a ship with multiple individual units, an oil rig, a house, a stadium, and other venues or spaces that may require a multi-switch module as discussed below.

The wireless signals 103 and 105 may include various types of data associated with them including various programming channel information such as a programming channel guide, metadata, location information, and the like. Various types of data may be communicated about the programming and grid guide including the programming channel number, a network identifier, program data such as a start and end time of airing, title, numerical identifier, content data such as actors, descriptions, ratings and the like. The program guide data may include the relative positions of the data, the line structures for forming the grid for the program guide and the like. The wireless signals 103 and 105 may also include various types of content (e.g., audio content, video content). A content provider may provide content to the central location 104. The content provider may include various television networks that provide programming and content for a particular programming channel as well as on-demand and pay-per-view providers that provide content for communication at particular times over programming channels specified at the central location 104.

The content distribution system 100 may include a local content distribution system 107 at the MDU 106 the MDU 106 includes an outdoor unit 108 that includes a control circuit 110 and a satellite receiving antenna (e.g., satellite dish) 112 that receives the wireless signals from the satellite 102. The content, programming channel information, and any other information included in the wireless signals 103 and 105 may be referred to as content signals herein when received at local content distribution system 107. The control circuit 110 controls the content signals from the satellite receiving antenna 112. The control circuit 110 controls the communication of the content signals to a multi-switch module 114, discussed in more detail below, such as a single-wire multi-switch (SWM) module.

In an embodiment, the control circuit 110 may be coupled to a power inserter polarity locker 116. The power inserter polarity locker 116 supplies voltage to the outdoor unit 108 (e.g., the satellite receiving antenna 112 and the control circuit 110) and locks the polarities of the content signals provided by the control circuit 110. Furthermore, in many situations it is necessary to amplify the content signals to start the trunk of the local content distribution system 107, which may be performed by a trunk amplifier 118 that is coupled to the power inserter polarity locker 116. From the trunk amplifier 118 the content signal may be tapped to provide the content signal to the individual user receivers (e.g., set top boxes) of the MDU 106 by a trunk tap 120 that is coupled to the trunk amplifier 118. The trunk tap 120 may provide the content signal from the trunk line to a multi-switch module expander 122 that is configured to provide the content signal to a multi-switch module 114. As will be described below, more than one multi-switch module 114 may be included within a local content distribution system 107. The multi-switch module 114 is used to multiplex content signals on one or more outputs. In some examples, the multiplexed output signals may have channels such as frequency blocks that provide requested programming channels designated for use by a particular user receiver's tuner within MDU 106. Furthermore, the content signals may be provided from the multi-switch module 114 to a splitting module (not illustrated) that is in communication with the multi-switch module 114. The splitting module may split the satellite signals for distribution to various user receivers within the MDU 106.

In an embodiment, the satellite receiving antenna 112 may receive wireless signals 105 from multiple satellites 102 that are in various orbital slots. As illustrated in FIG. 1, there are six cables between the control circuit 110 and the multi-switch module expander 122 and each cable provides content signals from a respective signal source such as a the satellite 102. While six cables are discussed and illustrated larger or smaller numbers of signal sources requiring more or few cables may be provided. In an example, a first cable provides an 18 volt control signal that controls the communication of content signals from the 101 and 99 orbital slots. Another signal less than 14 volts, such as 13 volts, controls the right hand polarization signals from the 101 orbital slot, which is provided on the second cable. An 18 volt signal together with a 22 kHz signal may control the output from the 103, 110 and 119 orbital slot left hand polarized transponders of the 103, 110 and 119 orbital slots on a third cable. A 13 volt control signal along with a 22 kHz AC control signal may control the passing of signals from the right hand polarized 103, 110 and 119 orbital slots on a fourth cable. The fifth cable may provide an 18 volt control signal that may control the passing of content signals from the left hand polarized 95 or 99RB/103RB orbital slots and an additional 18 volt control signal may control the passing of content signals from the right hand polarized 95 or 99RB/103RB orbital slots on a sixth cable.

An enclosure 124 may be used to enclose various local content distribution components. Also, various connectors or openings for connecting or receiving wires for electronically coupling the satellite receiving antenna 112 to the electrical components and for electrically coupling the electrical components to the unit configurations may be provided at the enclosure 124. The enclosure 124 may be mounted in various locations on the MDU 106 and/or may be in a data locker/room within the MDU 106.

Figure 2A:
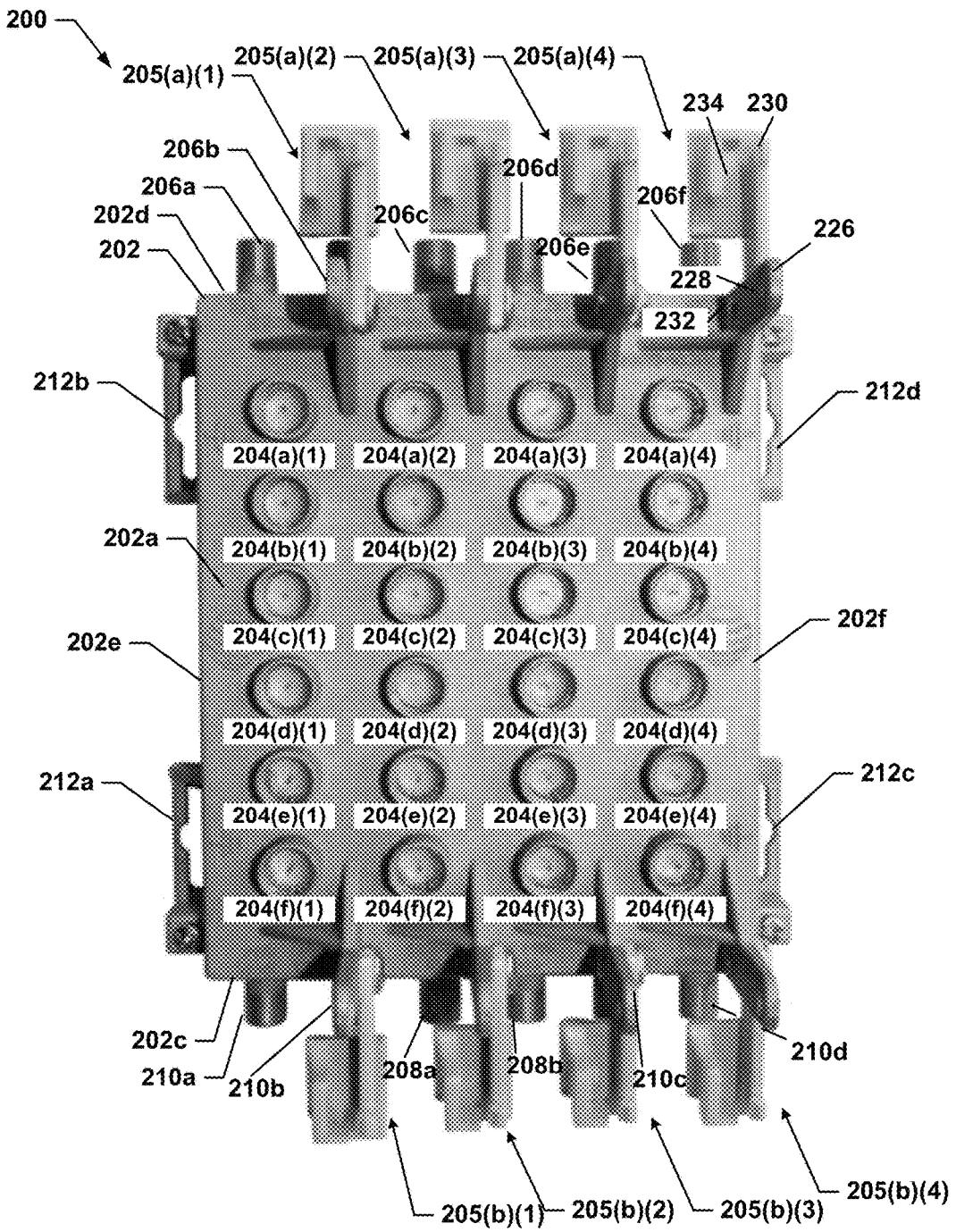
FIG. 2A is a top view illustrating an embodiment of a multi-switch module expander.
Figure 2B:
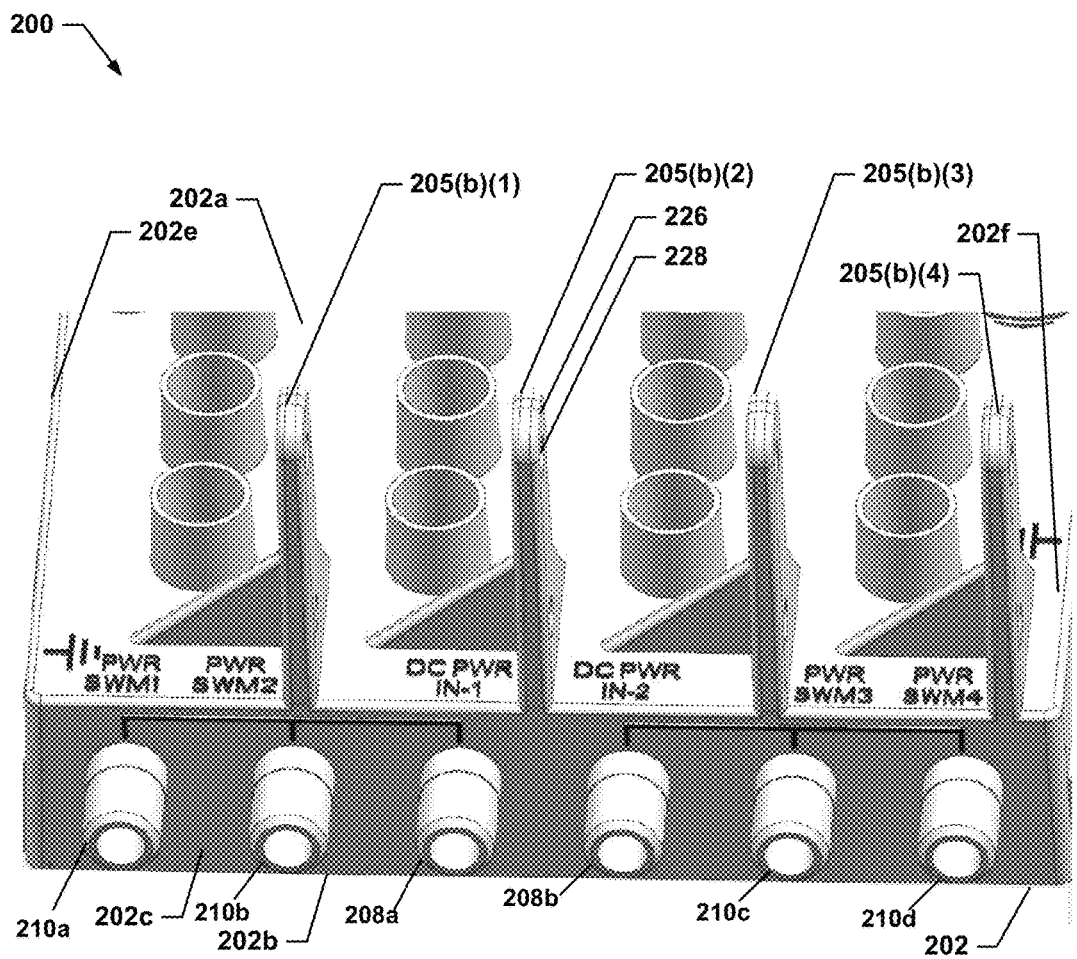
FIG. 2B is a partial perspective view illustrating an embodiment of the multi-switch module expander of FIG. 2A.
Figure 2C:
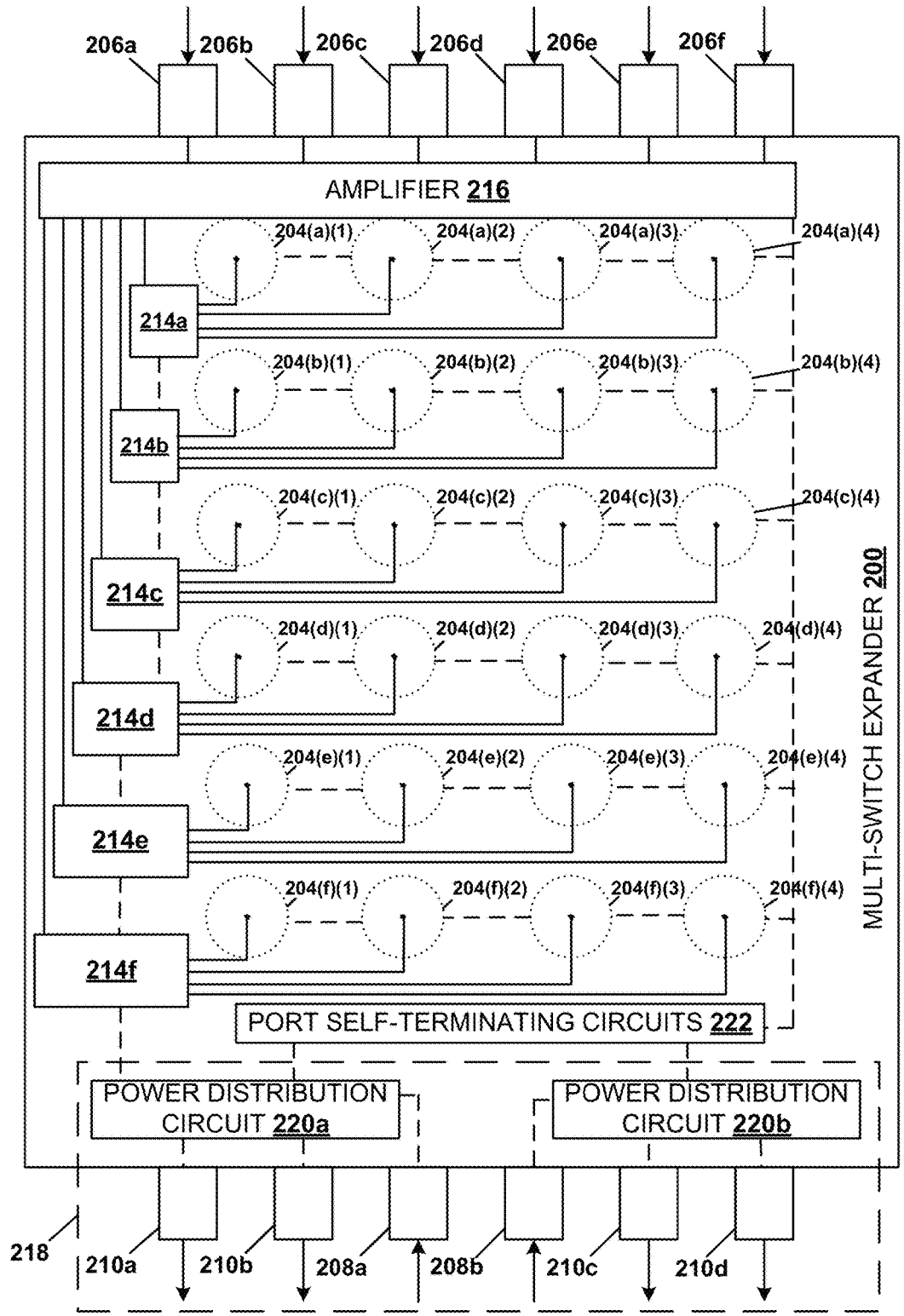
FIG. 2C is a schematic view illustrating an embodiment of the multi-switch module expander FIGS. 2A and 2B.

Referring now to FIGS. 2A, 2B, and 2C, a multi-switch module expander 200 is illustrated. In an embodiment, the multi-switch module expander 200 is the multi-switch module expander 122 of FIG. 1. The multi-switch module expander 200 includes a chassis 202 having a top surface 202a, a bottom surface 202b that is located opposite the chassis 202 from the top surface 202a, a front edge 202c extending between the top surface 202a and the bottom surface 202b, a rear edge 202d located opposite the chassis 202 from the front edge 202c and extending between the top surface 202a and the bottom surface 202b, and a pair of side edges 202e and 202f that are located opposite each other on the chassis 202 and that each extend between the top surface 202a, the bottom surface 202b, the front edge 202c, and the rear edge 202d. In an embodiment, the chassis 202 may include materials and formed such that the chassis 202 may be hardened or outdoor rated such that the chassis 202 protects the electronic components from moisture, temperature, and other environmental conditions such that the multi-switch module expander 200 can be mounted outside of the MDU 106.

In the illustrated embodiment, one or more multi-switch module expander components may be located on any of the surfaces and edges 202a-202f. For example, content signal output ports 204(a)(1)-204(f)(4) (e.g., radio frequency ports such ports that include a connector (e.g., an F connector) that couples RG-6 coaxial cables to the port) may be located on the top surface 202a and multi-switch module expander coupling features 205(a)(1)-205(b)(4) may extend from the top surface 202a, content signal input ports 206a-206f (e.g., radio frequency ports such as ports that include a connector (e.g., an F connector) that couples RG-6 coaxial cables to the port) may be located on the rear edge 202d, power input ports 208a and 208b and power output ports 210a-210d may be located on the front edge 202c, expander coupling features 212a and 212b for mounting the multi-switch module expander 200 to a wall, object, or any surface, may extend from the side edge 202e and expander coupling features 212c and 212d for mounting the multi-switch module expander 200 to a wall, object, or any surface may extend from the side edge 202f. While specific locations for the multi-switch module expander components are illustrated in FIG. 2A-2C, any of the multi-switch module expander components may be located on any of the surfaces and edges 202a-202f without departing from the scope of the present disclosure.

In an embodiment, the content signal output ports 204(a)(1)-204(f)(4) may be configured to couple with a plurality of multi-switch modules 114 such that the multi-switch modules 114 are vertically aligned such that benefits from stack effect airflow is realized to passively cool the multi-switch modules 114. For example, the content signal output ports 204(a)(1)-204(f)(4) extend generally orthogonal from the top surface 202a of the multi-switch module expander chassis 202 and are aligned and equispaced from each other such that the multi-switch modules 114 extend vertically from the top surface 202a. In another example, the expander coupling features 212a-212d and the content signal output ports 204(a)(1)-204(f)(4) may be configured such that the multi-switch expander 200 may be mounted to a vertical wall and such that the stack effect may be realized by multi-switch modules 114 coupled to the multi-switch expander 200 by drawing in air having a first temperature from one of the front edge 202c or rear edge 202d if the rear edge 202d is facing down and expelling the air having a second temperature that is greater than the first temperature at the rear edge 202d or front edge 202c if the rear edge 202d is facing down.

As indicated above, the multi-switch module expander 200 may include multi-switch module expander coupling features 205(a)(1)-205(b)(4). Each multi-switch module expander coupling feature 205(a)(1)-205(b)(4) may include a post 226 that extends from the top surface 202a of the multi-switch module expander 200. Each post 226 may be positioned relative to a respective column of content signal output ports (e.g., column that includes content signal output ports 204(a)(1), 204(b)(1), 204(c)(1), 204(d)(1), 204(e)(1), and 204(f)(1)) such that when a multi-switch module 114 is coupled to that respective column of content signal output ports, the post 226 and a multi-switch module mounting feature of the multi-switch module 114, discussed below, are substantially adjacent and parallel to each other. In an embodiment, the post 226 may include an aperture 228 for coupling the multi-switch module expander coupling feature to a multi-switch module mounting feature discussed below.

In various embodiments, each multi-switch module expander coupling feature 205(a)(1)-205(b)(4) may include a coupling member 230 that is pivotally coupled to the post 226 at pivot point 232. The coupling member 230 may define a slot 234 that is configured to receive the post 226 and the multi-switch module mounting feature, when the coupling member 230 is pivoted into a securing orientation from an unsecure orientation. As illustrated in FIG. 2A, the coupling member 230 is in the unsecure orientation and may pivot towards the front edge 202c or rear edge 202d of the multi-switch module expander 200.

In an embodiment, the chassis 202 may include an external "switch" or a port that may receive a 75 ohm terminator to indicate that only the first set of multi-switch module expander ports 204(a)(1), 204(b)(1), 204(c)(1), 204(d)(1), 204(e)(1), and 204(f)(1) shall pass tone and voltage back towards to outdoor unit 108 such that a multi-switch module 114 inserted into the multi-switch module expander 200 provides the "polarity locking" functionality for the outdoor unit 108. Each of the multi-switch modules 114 may provide polarity locking functionality such that the power inserter polarity locker 116 is not needed. The multi-switch module expander 200 may be configured to block the polarity locking functionality by blocking the tone and voltage provided back to the outdoor unit 108 from each of the multi-switch modules 114 coupled to the multi-switch module expander 200 or the allow the tone and voltage from one of multi-switch module 114 while blocking the tone and voltage from any other multi-switch modules. For example, a polarity locking port (not illustrated) included on the chassis 202 may be configured such that when there is no resistive cap (e.g., a 75 ohm cap) tone and voltage may be passed from one of the multi-switch modules 114 through the content signal input ports 206a-206f to the outdoor unit 108. However, if the polarity locking port is capped, then all tone and voltage may be blocked (e.g., DC blocked) from being passed through the multi-switch module expander 200 to the outdoor unit 108.

In an embodiment, the chassis 202 of the multi-switch module expander 200 may house components of the multi-switch module expander 200, only some of which are illustrated in FIG. 2C. For example, the chassis 202 of the multi-switch module expander 200 may house a plurality of splitting circuits 214a-214f that may split a content signal received from each content signal input port 206a-206f to a respective row of content signal output ports 204(a)(1)-204(f)(4). For example, the splitting circuit 214a may split the content signal received at the content signal input port 206a four ways to the content signal output ports 204(a)(1)-204(a)(4), the splitting circuit 214b may split the content signal received at content signal input port 206b four ways to the content signal output ports 204(b)(1)-204(b)(4), the splitting circuit 214c may split the content signal received at the content signal input port 206c four ways to content signal output ports 204(c)(1)-204(c)(4), the splitting circuit 214d may split the content signal received at the content signal input port 206d four ways to the content signal output ports 204(d)(1)-204(d)(4), the splitting circuit 214e may split the content signal received at the content signal input port 206e four ways to the content signal output ports 204(e)(1)-204(e)(4), and the splitting circuit 214f may split the content signal received at the content signal input port 206f four ways to the content signal output ports 204(f)(1)-204(f)(4). While, six rows of content signal output ports and four columns of content signal output ports are illustrated, one of skill in the art in possession of the present disclosure will recognize that any number of rows and columns of content signal output ports may be contemplate to receive and provide content signals to a plurality of multi-switch modules and fall under the scope of the present disclosure. Thus, the splitting circuits 214a-214f may split the content signals any number of ways (e.g., 2, 3, 4, 6, 8) and still fall under the scope of the present disclosure.

In an embodiment, the chassis 202 may house an amplifying circuit 216 that may be coupled between the splitting circuits 214a-214f and the content signal input ports 206a-206f. However, in other embodiments the amplifying circuit may be coupled between the splitting circuits 214a-214f and the content signal output ports 204(a)(1)-204(f)(4) or any other configuration such that the amplifying circuit 216 amplifies the content signals received at the content signal input ports 206a-206f before the content signals are provided to the content signal output ports 204(a)(1)-204(f)(4). The amplification of the content signals is to account for a signal loss provided by the splitting circuits 214a-214f and other components of the multi-switch module expander 200. For example, the amplifying circuit 216 may compensate the content signals by 10-12 dB to overcome the 10-12 dB of nominal loss experienced because of the splitting circuit 214a-214f that splits the content signals four ways. However, the amplifying circuit 216 may provide a different gain depending on the number of times the content signals are split by the splitting circuits 214a-214f and other factors and components that cause loss of the content signal.

The chassis 202 may also house a power supply system 218 that includes the power input ports 208a and 208b and power output ports 210a-210d. The power input ports 208a and 208b may be configured to couple to a power inserter (e.g., a 29 V power inserter). However, in other embodiments, the power input ports 208a and 208b may be configured to couple to other power inserters and/or other power supplies. Each power input port 208a and 208b may be coupled to a power distribution circuit 220a and 220b, respectfully. However, in other embodiments, the power distribution circuit 220a and 220b may be provided by the same circuit rather than separate circuits as illustrated in FIG. 2C. The power distribution circuit 220a and 220b may each include a power divider that divides the power being provided to the power input ports 208a and 208b such that the power being received at power input port 208a is provided to power output ports 210a and 210b and power provided to power input ports 208b is provided to power output ports 210c and 210d. The power output ports 210a-210d may be configured to provide power to multi-switch modules 114 and/or other external devices such as cooling systems, sensors, and other external devices included in the local content distribution system 124 that require power.

In an embodiment, the power distribution circuits 220a and 220b may provide power to components housed in the chassis 202. For example, power distribution circuits 220a and 220b may provide power to the splitting circuits 214a-214f and the amplifying circuit 216. In various embodiments, the chassis 202 may house port self-terminating circuits 222, which may receive power from the power distribution circuits 220a and 220b. The port self-terminating circuits 222 may include self-terminating circuits that are configured to terminate each content signal output port 204(a)(1)-204(f)(4) when not coupled to a corresponding content signal input port of a multi-switch module. For example, each content signal output port 204(a)(1)-204(f)(4) may be coupled with the self-terminating circuit that provides 75 ohms of resistance when not coupled to a corresponding port of a multi-switch module, however, other impedances (e.g., 50, 60, 70, 80, 90, 100) may be contemplated. The port self-terminating circuits 222 limit reflection of content signals off the unused content signal output port 204(a)(1)-204(f)(4) that may cause distortion or degradation content signal levels and mis-operation of the system in digital signals and video ghosting and/or power loss in analog signals.

Figure 3A:
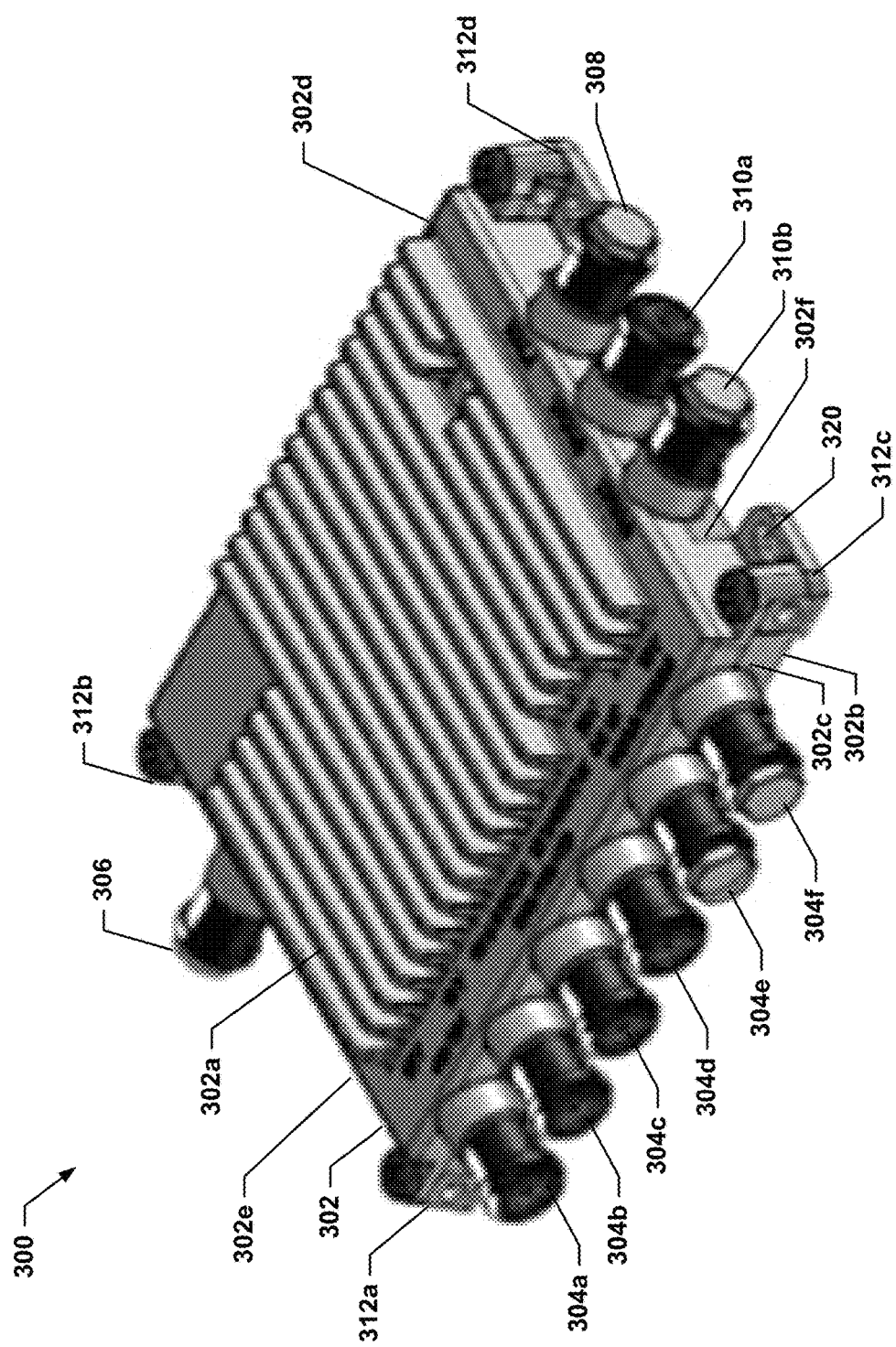
FIG. 3A is a perspective view illustrating an embodiment of a multi-switch module.
Figure 3B:
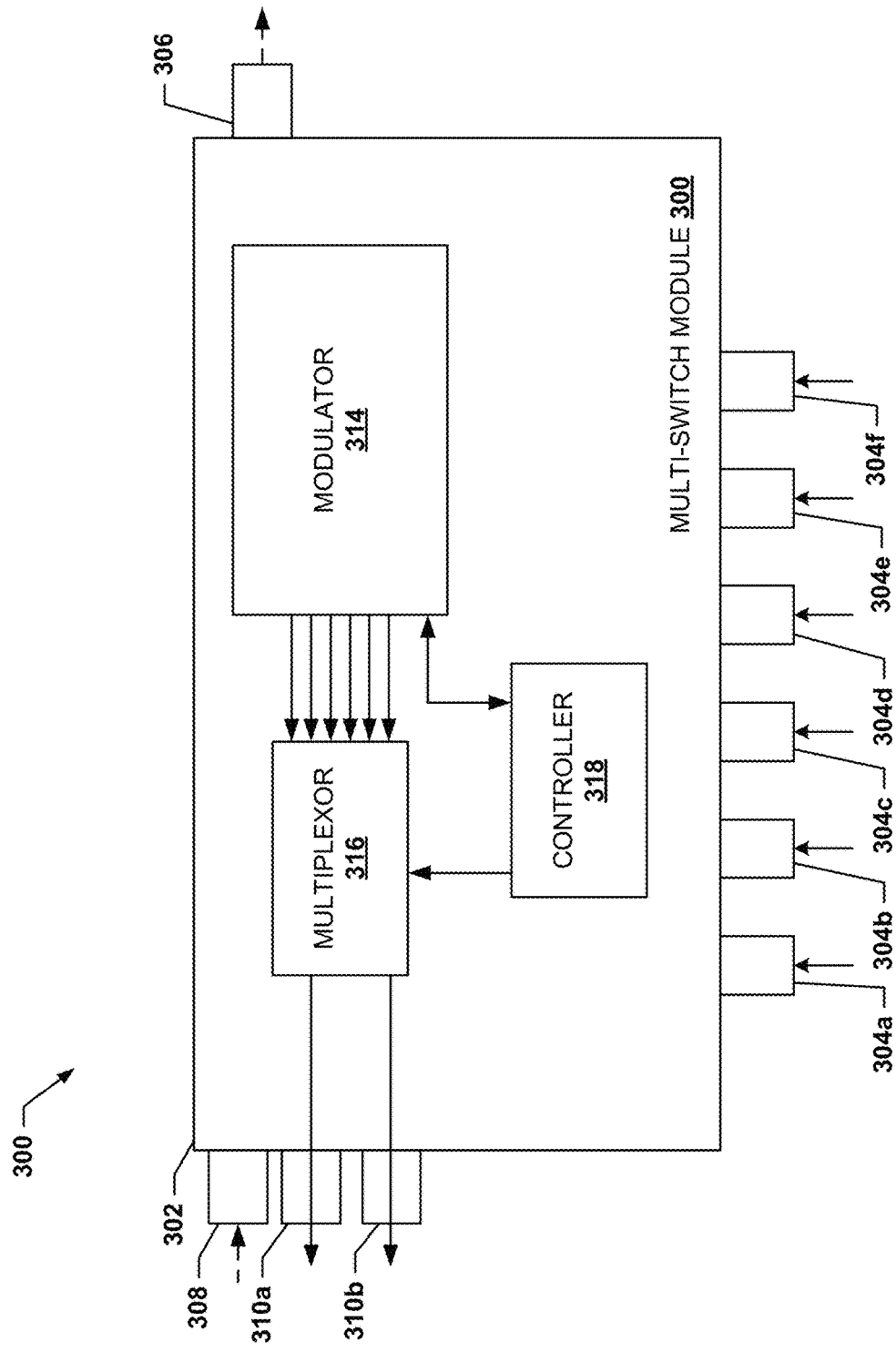
FIG. 3B is a schematic view illustrating an embodiment of the multi-switch module of FIG. 3A.

Referring now to FIGS. 3A and 3B, a multi-switch module 300 is illustrated that may be any of the multi-switch modules 114 illustrated in FIG. 1. The multi-switch module 300 includes a chassis 302 having a top surface 302a, a bottom surface 302b that is located opposite the chassis 302 from the top surface 302a, a front edge 302c extending between the top surface 302a and the bottom surface 302b, a rear edge 302d located opposite the chassis 302 from the front edge 302c and extending between the top surface 302a and the bottom surface 302b, and a pair of side edges 302e and 302f that are located opposite each other on the chassis 302 and that each extend between the top surface 302a, the bottom surface 302b, the front edge 302c, and the rear edge 302d. In the illustrated embodiment, one or more multi-switch module components may be located on any of the surfaces and edges 302a-302f. For example, content signal input ports 304a-304f may be located on the front edge 302c, a power output port 306 may be located on the side edge 302e, a power input port 308 and content signal output ports 310a and 310b may be located on side edge 302f, and multi-switch module mounting features 312a and 312b may extend from the side edge 302e while multi-switch module mounting features 312c and 312d may extend from the side edge 302f. While specific locations for the multi-switch module components are illustrated in FIG. 3A-3B, any of the multi-switch module components may be located on any of the surfaces and edges 302a-302f without departing from the scope of the present disclosure.

In an embodiment, the chassis 302 of the multi-switch module 300 may house components of the multi-switch module 300, only some of which are illustrated in FIG. 3B. For example, the chassis 302 may house a modulator module 314 that is configured to provide modulated signals received from the content signal input ports 304a-304f. The content signal input ports 304a-304f may receive the external content signals where each include various frequencies and/or polarizations corresponding to transponders of the satellite(s) 102. More specifically, the content signals for each content signal input ports 304a-304f correspond to the transponders for the different orbital locations of the satellite(s) 102 as discussed above. The multi-switch module 300 assigns a different channel which is a frequency block for each tuner module within user receivers in the MDU 106 that require a channel signal. Thus, each of the tuner modules is assigned a different frequency block for communication by the multi-switch module 300. Each of the user receivers thus generates a request for a programming channel that includes programming from one of the content signals received at the content signal input ports 304a-304f. The programming channels are then modulated by the modulator module 314 into the channel (i.e., frequency block) corresponding to the tuner of the user receivers. The channels may be combined onto the content signal output ports 310a and 310b using a multiplexer 316 that is housed in the chassis 302. The content signals provided by the channels provided by the content signal output ports 310a and 310b may be provided downstream to a splitter module that splits the combined signal for each tuner or user receiver. However, in other embodiments, the content signals provided by the content signal output ports 310a and 310b may be provided to other local content distribution system components. Every tuner may receive every requested channel but only the channel corresponding thereto is displayed.

A controller 318 housed in the chassis 302 may control the communication and the modulator modules 312 to provide the proper content signal for the user receivers. Various numbers of devices and/or tuners may be provided the content signals depending upon the capacity of the multi-switch module 300. For example, in the illustrated embodiment, the multi-switch module 300 is a single-wire multi-switch module, which takes all of the content signals provided by the content signal input ports 304a-304f and combines them into a single output. The multi-switch module 300 provides thirty different channels. However, in other embodiments, the multi-switch module 300 may be configured for any number of channels such as 5, 8, 16, 32, and the like. In various embodiments, the power output port 306 may be configured to provide power to other devices such as external cooling systems and other devices.

Figure 4:
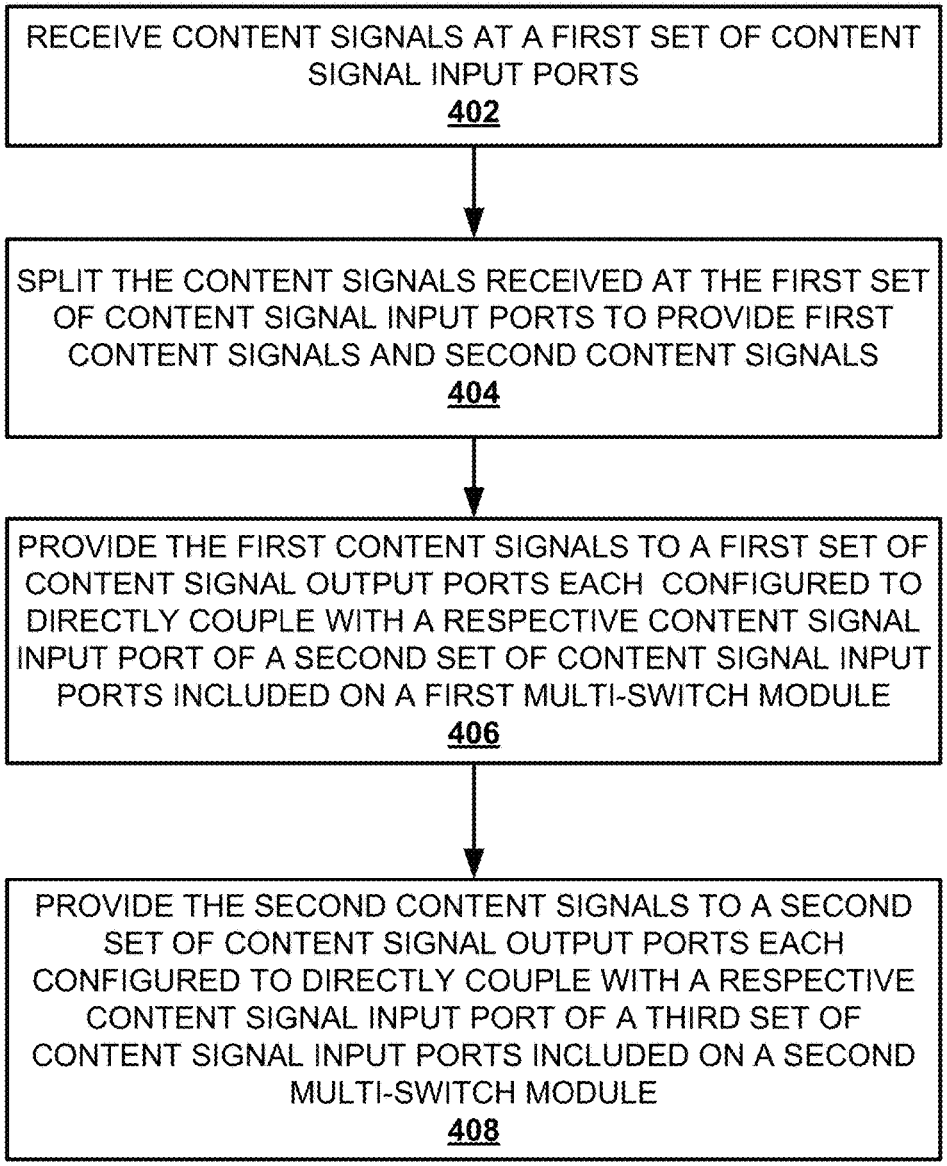
FIG. 4 is flowchart illustrating a method of providing satellite content signals with the multi-switch module expander to a plurality of multi-switch modules.
Figures 5A, 5B:
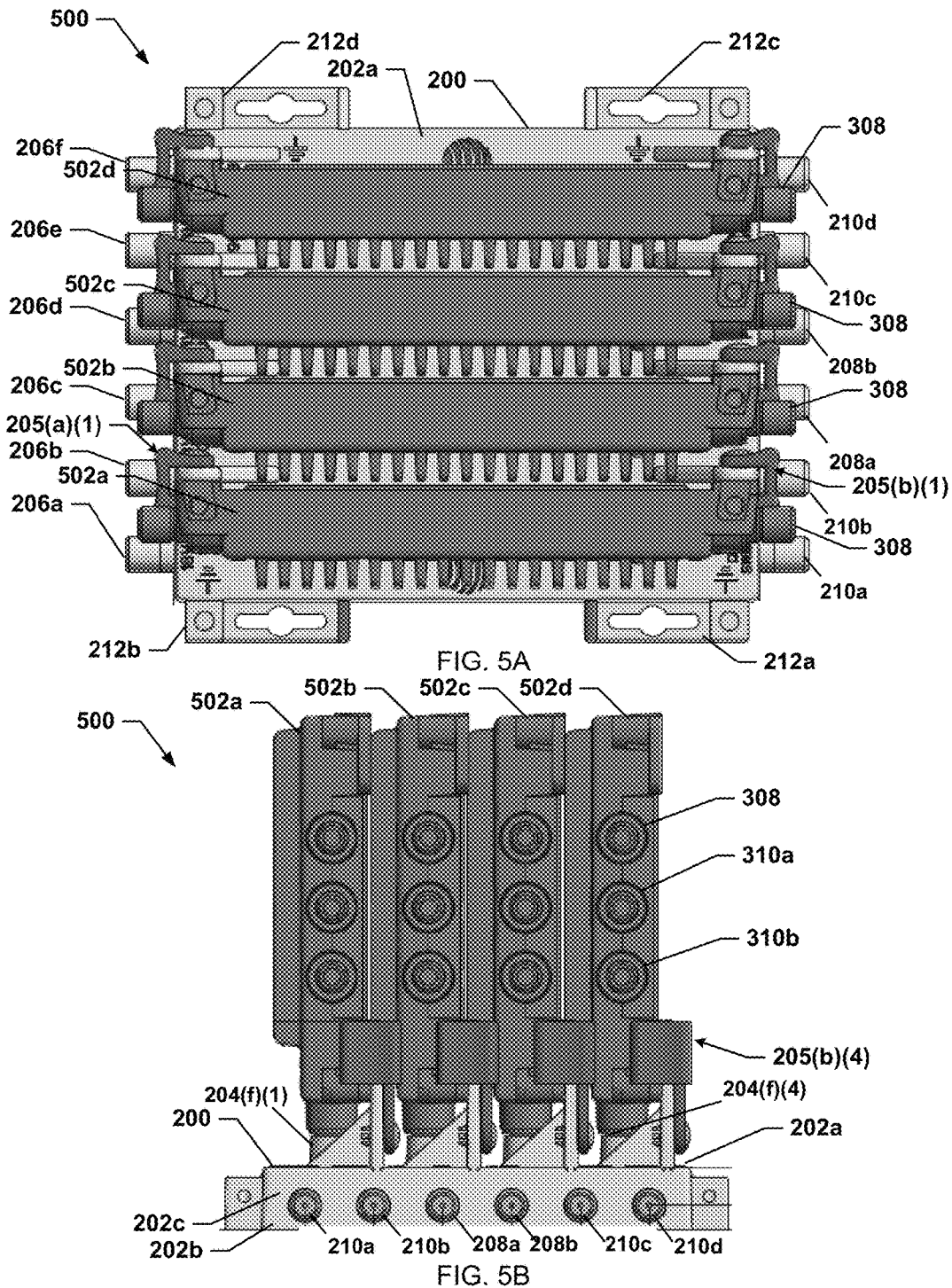
FIG. 5A is a top surface view illustrating an embodiment of a multi-switch system including the multi-switch module expander of FIGS. 2A-2C coupled with four of the multi-switch modules of FIGS. 3A and 3B.
FIG. 5B is a front edge view illustrating an embodiment of the multi-switch system including the multi-switch module expander of FIGS. 2A-2C coupled with four of the multi-switch modules of FIGS. 3A and 3B.
Figures 5C, 5D:
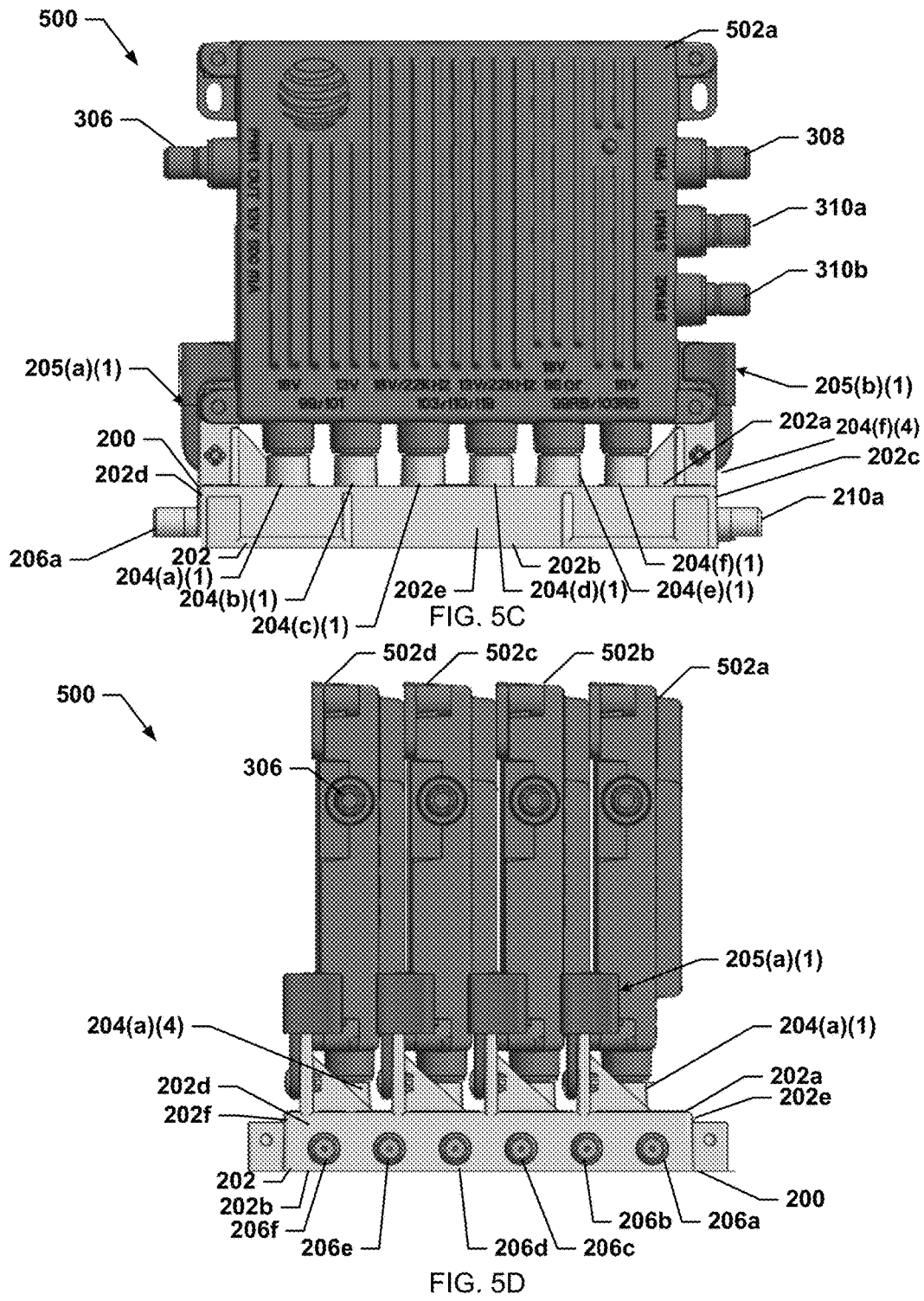
FIG. 5C is a side edge view illustrating an embodiment of the multi-switch system including the multi-switch module expander of FIGS. 2A-2C coupled with four of the multi-switch modules of FIGS. 3A and 3B.
FIG. 5D is a rear edge view illustrating an embodiment of the multi-switch system including the multi-switch module expander of FIGS. 2A-2C coupled with four of the multi-switch modules of FIGS. 3A and 3B.

Referring now to FIG. 4, an embodiment of a method 400 for providing content signals to a plurality of multi-switch modules is illustrated. As discussed below, the systems and methods of the present disclosure provide a multi-switch module expander that is configured to provide content signals provided by a satellite signal receiving antenna and power to a plurality of multi-switch modules, and provide several benefits over conventional local content distribution systems that include a plurality of multi-switch modules. The multi-switch module expander of the present disclosure addresses the issues discussed above by providing splitting circuits, an amplifying circuit, and power distribution within a chassis of the multi-switch module expander and is mechanically configured to couple and secure a plurality of multi-switch modules to the chassis of the multi-switch module expander such that the multi-switch module expander eliminates the need for the extra splitters, power supplies, cabling, and amplifiers that are required in traditional systems.

Prior to the method 400 and referring to FIGS. 5A, 5B, 5C, 5D, and 6, the local content distribution system may be assembled. For example, the assembly of the local content distribution system may include coupling a plurality of multi-switch modules 300 to the multi-switch module expander 200 to provide a multi-switch system 500. The multi-switch system 500 may include the multi-switch module expander 200 of FIGS. 2A-2C and at least one multi-switch module 300 of FIGS. 3A-3B. As illustrated in FIGS. 5A-5D, four multi-switch modules 502a, 502b, 502c, and 502d may be coupled to the multi-switch module expander 200. The content signal output ports 204(a)(1)-204(f)(4) of each column (e.g., columns 1-4) of multi-switch module expander 200 may be spaced apart and configured to receive the content signal input ports 304a-304f of a multi-switch module 300. For example, the content signal input ports 304a-304f provided by the multi-switch module 502a may be coupled to content signal output ports 204(a)(1), 204(b)(1), 204(c)(1), 204(d)(1), 204(e)(1), and 204(f)(1), respectively. Likewise, the content signal input ports 304a-304f provided by the multi-switch module 502b may be coupled to content signal output ports 204(a)(2), 204(b)(2), 204(c)(2), 204(d)(2), 204(e)(2), and 204(f)(2), the content signal input ports 304a-304f provided by the multi-switch module 502c may be coupled to content signal output ports 204(a)(3), 204(b)(3), 204(c)(3), 204(d)(3), 204(e)(3), and 204(f)(3), and the content signal input ports 304a-304f provided by the multi-switch module 502d may be coupled to content signal output ports 204(a)(4), 204(b)(4), 204(c)(4), 204(d)(4), 204(e)(4), and 204(f)(4).

In an embodiment, when the content signal input ports 304a-304f of a multi-switch module 300 are inserted into the corresponding content signal output ports of the multi-switch module expander 200, the coupling of those ports may provide a frictional coupling such that a predetermined threshold force is required to separate the multi-switch module 300 from the multi-switch module expander 200. However, in other embodiments and as discussed above, the multi-switch module expander 200 may include multi-switch module expander coupling features 205(a)(1)-205(b)(4). Each multi-switch module expander coupling feature 205(a)(1)-205(b)(4) may include a post 226 that extends from the top surface 202a of the multi-switch module expander 200. Each post 226 may be positioned relative to a respective column of content signal output ports such that when the content signal input ports 304a-304f of a multi-switch module 300 is coupled to that respective column of content signal output ports, the post 226 and a multi-switch module mounting feature (e.g., a multi-switch module mounting feature 312a or 312c of the multi-switch module 300) are substantially adjacent and parallel to each other. In an embodiment, the post 226 and the multi-switch module mounting feature 312a or 312c may each include the aperture 228 and an aperture 320, respectively, that are configured such that, when the content signal input ports 304a-304f of multi-switch module 300 are coupled to that respective column of content signal output ports, the apertures 228 and 320 of each align and a fastener may be inserted through the apertures 228 and 320 to further secure the multi-switch module 300 to the multi-switch module expander 200.

In yet another embodiment, each multi-switch module expander coupling feature 205(a)(1)-205(b)(4) may include a coupling member 230 that is pivotally coupled to the post 226 at a pivot point 232. The coupling member 230 may define a slot 234 that is configured to receive the post 226 and the multi-switch module mounting feature 312a or 312c, when the coupling member 230 is pivoted into the securing orientation from the unsecure orientation. As illustrated in FIGS. 5A-5D, the coupling member 230 is in the secure orientation and may pivot away from the side edges 302e or 302f of any of the multi-switch modules 502a-502d. The coupling member 320 when in the securing orientation may prevent horizontal and/or vertical movement of the multi-switch module being secured by the coupling member 320.

Figure 6:
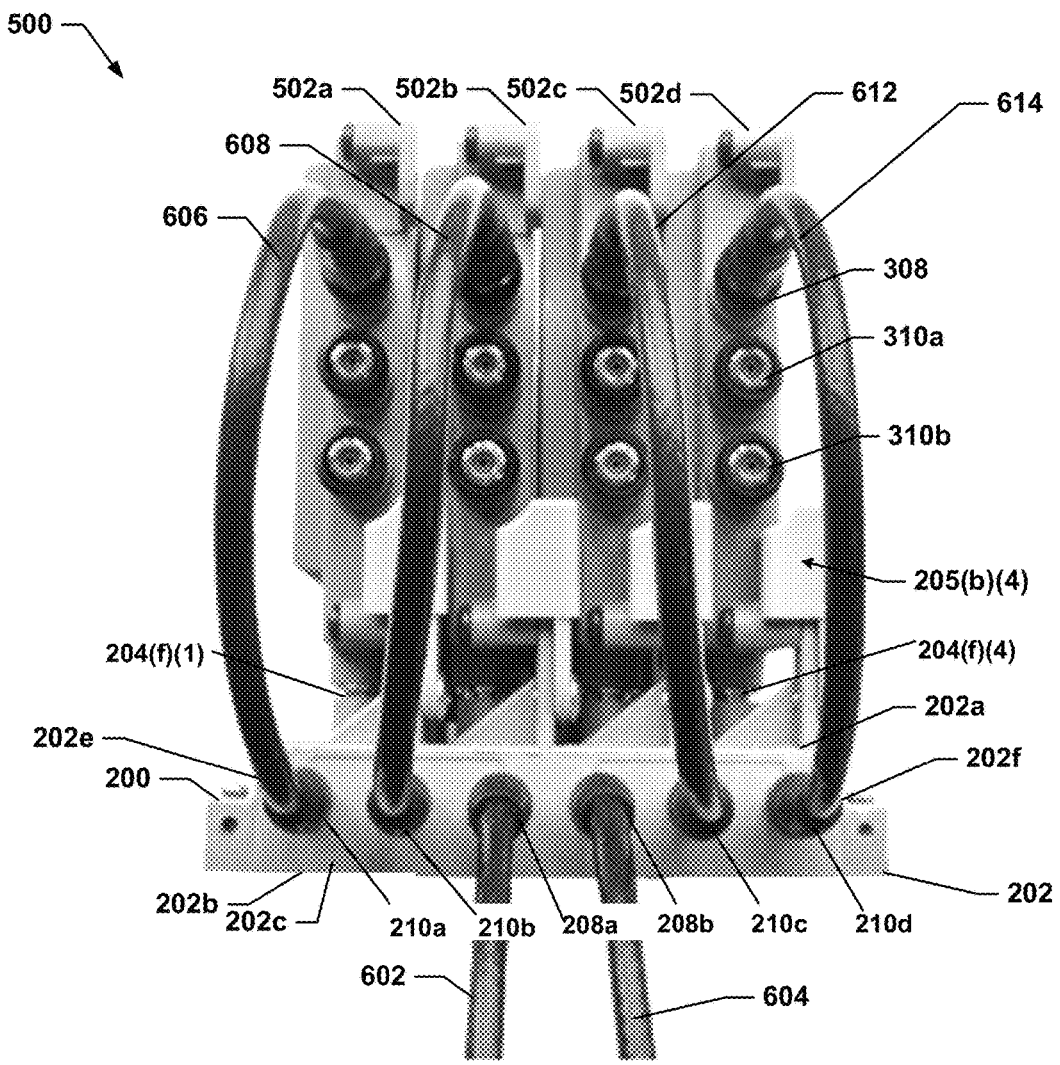
FIG. 6 is the front edge view FIG. 5B illustrating an embodiment of the multi-switch system of FIGS. 5A-5D including the multi-switch module expander of FIGS. 2A-2C coupled with four of the multi-switch modules of FIGS. 3A and 3B and including power connections.

Referring now to FIG. 6, in addition to coupling at least one multi-switch module 502a-502d to the multi-switch module expander 200 as illustrated in FIGS. 5A-5D when assembling the multi-switch system 500, cabling may be coupled to the input and output ports of the multi-switch module 300 and the multi-switch module expander 200. As illustrated in FIG. 6, a cable 602 and 604 may be coupled to the power input ports 208a and 208b of the multi-switch module expander 200 and provide power from a power supply (e.g., a power inserter 29V) to the multi-switch module expander 200. While two cables 602 and 604 are illustrated, more or fewer cables may be coupled to the multi-switch module expander 200 to provide power depending on the number of power input ports on the multi-switch module expander 200, the number of multi-switch modules 300 coupled to the multi-switch module expander 200, and/or the amount of power being provided from the power supply. As illustrated, there is a two to one ratio between the number of power input ports 208a and 208b and the power output ports 210a-210d. Cables 606, 608, 610, and 612 may be coupled between the power output ports 210a-210 and the power input ports 308 of each multi-switch module 502a-502d. While FIG. 6 illustrates the cables 602-612 used to provide power to the multi-switch system 500, one skilled in the art will recognize that the multi-switch system 500 will include cables for the content signal to be transmitted from the satellite receiving antenna 112 to the content signal input ports 206a-206f and include cables that will provide the modulated content signal from the content signal output ports 310a and 310b of the multi-switch module 300 to downstream components of the local content distribution system 107.

Thus, referring back to FIG. 4, the method 400 begins at block 402 where the multi-switch module expander receives content signals at a first set of content signal input ports. In an embodiment at block 402, the first set of the content signal input ports may include all of the content signal input ports 206a-206f. However, in other examples, the content signals may only be provided to content signal input ports 206a-206d or other combinations of the content signal input ports 206a-206f.

The method 400 may then proceed to block 404, where the content signals received at the first set of content signal input ports are split to provide first content signals and second content signals. In an embodiment at block 404, the splitting circuits 214a-214f may be configured to split a respective content signal received at the content signal input ports 206a-206f based on the number of columns of content signal output ports available to couple with a multi-switch module 300. With respect to the example illustrated in FIGS. 5A-5D and FIG. 6, there are four columns of content signal output ports provided by the multi-switch module expander 200. Therefore, the splitting circuits 214a-214f may be configured to split the content signal received at the content signal input ports 206a-206f four ways. In various embodiments, the splitting circuits 214a-214f may cause signal loss depending on the number times the signal is split. For example, the four-way splitting circuits 214a-214f may cause 10-12 dB loss in the content signal. The amplifying circuit 216 may amplify the content signals prior to and/or subsequent to the content signals being split by the splitting circuits 214a-214f to account for the signal loss caused by the splitting circuits 214a-214f.

The method 400 may then proceed to block 406 where the first content signals are provided to a first set of content signal output ports that are directly coupled (e.g., directly engaged) with a respective content signal input port of a second set of content signal input ports provided by a first multi-switch module and to block 408 where the second content signals are provided to a second set of content signal output ports that are each directly coupled with a respective content signal input port of a third set of content signal input ports provided by a second multi-switch module. In an embodiment at block 404, the splitting circuits 214a-214f may be configured to provide the split content signals to the content signal output ports. In the example illustrated in FIGS. 5A-5D and 6, the splitting circuit 214a may provide the content signal received at the content signal input port 206a to the content signal input ports 204(a)(1), 204(a)(2), 204(a)(3), and 204(a)(4), the splitting circuit 214b may provide the content signal received at the content signal input port 206b to the content signal input ports 204(b)(1), 204(b)(2), 204(b)(3), and 204(b)(4), the splitting circuit 214c may provide the content signal received at the content signal input port 206c to the content signal input ports 204(c)(1), 204(c)(2), 204(c)(3), and 204(c)(4), the splitting circuit 214d may provide the content signal received at the content signal input port 206d to the content signal input ports 204(d)(1), 204(d)(2), 204(d)(3), and 204(d)(4), the splitting circuit 214e may provide the content signal received at the content signal input port 206e to the content signal input ports 204(e)(1), 204(e)(2), 204(e)(3), and 204(e)(4), and the splitting circuit 214f may provide the content signal received at the content signal input port 206f to the content signal input ports 204(f)(1), 204(f)(2), 204(f)(3), and 204(f)(4).

In various embodiments, the multi-switch module expander 200 may be configured to only provide the content signal to the content signal output ports that are directly coupled with a content signal input port. For example, the content signals from the splitting circuits 214a-214f may be provided to content signal output ports 204(a)(1), 204(b)(1), 204(c)(1), 204(d)(1), 204(e)(1), and 204(f)(1) when directly coupled to respective content signal input ports 304a-304f of a multi-switch module 300 while the remaining content signal output ports do not receive a content signal when not directly coupled to any input ports of a multi-switch module 300. In another example, the multi-switch module 300 may only include input ports 304a-304d and thus content signal output ports 204(a)(1), 204(b)(1), 204(c)(1), and 204(d)(1) will receive content signals, while 204(e)(1) and 204(f)(1) do not. The multi-switch module expander 200 may include the port self-terminating circuits 222 that are configured to terminate the content signal at each content signal output port that is not directly coupled with an input port of a multi-switch module 300. In one example, the port self-terminating circuits 222 may include a resistor to provide an impedance (e.g., 75 Ohms) that blocks the content signals. For example, power is provided to the multi-switch module expander 200, the power supply system 218 may provide current to activate the port self-terminating circuits 222 which may include a relay switch on a backplane to terminate any open content signal output port on the multi-switch module expander 200. In an example, each content signal output port 204(a)(1)-204(f)(4) may include its own integrated circuit chip that detects power coming into the multi-switch module expander 202 and provides a 75 ohm impedance to its respective content signal output port if a multi-switch module 114 is not detected.

In various embodiments, the method 400 may include receiving first power on a first power input port provided by the multi-switch module expander 200. For example, the power input port 208a of the multi-switch module expander 200 may receive first power. The first power may be provided to the power distribution circuit 220a, which may provide a first portion of the power to the components of the multi-switch module expander 200 such as the splitting circuits 214a-214f, the amplifying circuit 216, the port self-terminating circuits 222 and any other components of the multi-switch module expander 200. The power distribution circuit 220a may provide a second portion of the power to the power output port 210a and a third portion of the power to the power output port 210b. The power output port 210a and 210b may be coupled to a respective power input port 308 of a multi-switch module 300. As illustrated in the specific example in FIG. 6, the power output port 210a may be coupled to the power input port 308 of the multi-switch module 502a while the power output port 210b may be coupled to the power input port 308 of the multi-switch module 502b. The second portion of the first power may be provided to the multi-switch module 502a while the third portion of the first power may be provided to the multi-switch module 502b.

Additionally, the method 400 may include receiving second power on a second power input port provided by the multi-switch module expander 200. For example, the power input port 208b of the multi-switch module expander 200 may receive second power. The second power may be provided to the power distribution circuit 220b, which may provide a first portion of the second power to the components of the multi-switch module expander 200 such as the splitting circuits 214a-214f, the amplifying circuit 216, the port self-terminating circuits 222 and any other components of the multi-switch module expander 200. The power distribution circuit 220a may provide a second portion of the second power to the power output port 210c and a third portion of the second power to the power output port 210d. The power output port 210c and 210d may be coupled to a respective power input port 308 of a multi-switch module 300. As illustrated in the specific example in FIG. 6, the power output port 210c may be coupled to the power input port 308 of the multi-switch module 502c while the power output port 210d may be coupled to the power input port 308 of the multi-switch module 502d. The second portion of the second power may be provided to the multi-switch module 502c while the third portion of the second power may be provided to the multi-switch module 502d.

Thus, systems and methods have been described that provided for a local content distribution system that includes a multi-switch module expander that is configured to receive power from a power source and content signals from a satellite receiving antenna and provide that power and those content signals to a plurality of multi-switch modules. The multi-switch module expander includes an amplifying circuit that may amplify a content signal to account for a loss in the content signal due to splitting circuits included in the multi-switch module expander that split the received content signals and provide those signals to each of the plurality of output ports that are directly coupled to an content signal input port of a multi-switch module. The multi-switch module expander may include port self-terminating circuits that may terminate content signals being received on content signal output ports of the multi-switch module expander that are not directly coupled with a respective content signal input port of the multi-switch module or are otherwise unused. Thus, the multi-switch module expander of the present disclosure greatly simplifies a local content distribution system in an MDU requiring more than one multi-switch module by eliminating the need for splitters, cabling, amplifiers and other components in a conventional local content distribution systems requiring more than one multi-switch module.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-switch module expander, comprising:
    a multi-switch module expander chassis;
    a first set of signal input ports provided on the multi-switch module expander chassis;
    a first set of signal output ports provided on a first surface of the multi-switch module expander chassis, wherein each signal output port of the first set of signal output ports is configured to directly engage with a respective signal input port of a second set of signal input ports provided on a first multi-switch module;
    a second set of signal output ports provided on the first surface of the multi-switch module expander chassis, wherein each signal output port of the second set of signal output ports is configured to directly engage with a respective signal input port of a third set of signal input ports provided on a second multi-switch module; and
    a splitting circuit housed in the multi-switch module expander chassis and coupled to the first set of signal input ports, the first set of signal output ports, and the second set of signal output ports and configured to provide signals received at each signal input port of the first set of signal input ports to a first respective signal output port of the first set of signal output ports and to a second respective signal output port of the second set of signal output ports.

2. The multi-switch module expander of claim 1, further comprising:
    a first power input port provided on the multi-switch module expander chassis and configured to couple with a power source and provide power to the splitting circuit.

3. The multi-switch module expander of claim 2, further comprising:
    a first power output port and a second power output port provided on the multi-switch module expander chassis; and
    a power divider coupled to the first power input port, the first power output port, and the second power output port, wherein the power divider is configured to provide a first portion of power received by the first power input port to the first power output port and a second portion of the power to the second power output port.

4. The multi-switch module expander of claim 1, further comprising:
    an amplifying circuit housed in the multi-switch module expander chassis and coupled to the splitting circuit, wherein the amplifying circuit is configured to amplify the signals before the signals are provided to the first set of signal output ports and the second set of signal output ports to account for a loss provided by the splitting circuit.

5. The multi-switch module expander of claim 1, wherein the first set of signal output ports and the second set of signal output ports each include a self-terminating circuit.

6. The multi-switch module expander of claim 1, further comprising:
    at least one multi-switch module expander mounting member coupled to the multi-switch module expander chassis, wherein the at least one multi-switch module expander mounting member is configured to mount a surface of the multi-switch module expander chassis that does not include a port to a mounting structure.

7. The multi-switch module expander of claim 1, further comprising:
    a multi-switch module expander coupling member coupled to the multi-switch module expander chassis and configured to couple with a multi-switch module mounting feature provided on at least one of the first multi-switch module and the second multi-switch module, wherein the multi-switch module mounting feature is configure to mount at least one of the first multi-switch module and the second multi-switch module to a surface.

8. The multi-switch module expander of claim 1, wherein the first multi-switch module and the second multi-switch module are single-wire multi-switch modules that are configured to multiplex the signals received via the second set of signal input ports and the third set of signal input ports, respectfully, and provide a portion of those multiplexed signals through a single-wire output port provided on each of the first multi-switch module and the second multi-switch module via a plurality of channels.

9. The multi-switch module expander of claim 1, wherein the first set of signal input ports, the first set of signal output ports, and the second set of signal output ports include a coaxial cable port.

10. The multi-switch module expander of claim 1, wherein the first set of signal input ports are substantially orthogonal to the first set of signal output ports and the second set of signal output ports.

11. The multi-switch module expander of claim 1, wherein the signal output ports of given first or second sets thereof are aligned and equispaced from each other.

12. The multi-switch module expander of claim 1, wherein the second set of signal output ports are provided on a second surface of the multi-switch module expander chassis.

13. A method, comprising:
receiving signals at a first set of signal input ports provided on a multi-switch module expander chassis;
splitting the signals received at the first set of signal input ports to provide first signals and second signals; and
providing the first signals to a first set of signal output ports provided on the multi-switch module expander chassis, wherein each signal output port of the first set of signal output ports is configured to directly engage with and provide a portion of the first signals to a respective signal input port of a second set of signal input ports provided on a first multi-switch module; and
providing the second signals to a second set of signal output ports provided on the multi-switch module expander chassis, wherein each signal output port of the first set of signal output ports is configured to directly engage with and provide a portion of the second signals to a respective signal input port of a third set of signal input ports provided on a second multi-switch module.

14. The method of claim 13, further comprising:
receiving first power on a first power input provided on the multi-switch module expander chassis; and
providing a first portion of the first power to a splitting circuit that performs the splitting the signals.

15. The method of claim 13, further comprising:
amplifying the signals before the signals are provided to the first set of signal output ports and the second set of signal output ports to account for a loss provided by splitting the signals.

16. The method of claim 13, further comprising:
coupling a multi-switch module expander coupling member that is provided on the multi-switch module expander chassis with a multi-switch module mounting feature provided on the first multi-switch module, wherein the multi-switch module mounting feature is configured to mount the first multi-switch module to a surface.

\* \* \* \* \*